April 20, 1926. 1,581,860
H. NICHOLS
VEHICLE WHEEL
Filed Jan. 26, 1925 2 Sheets-Sheet 1
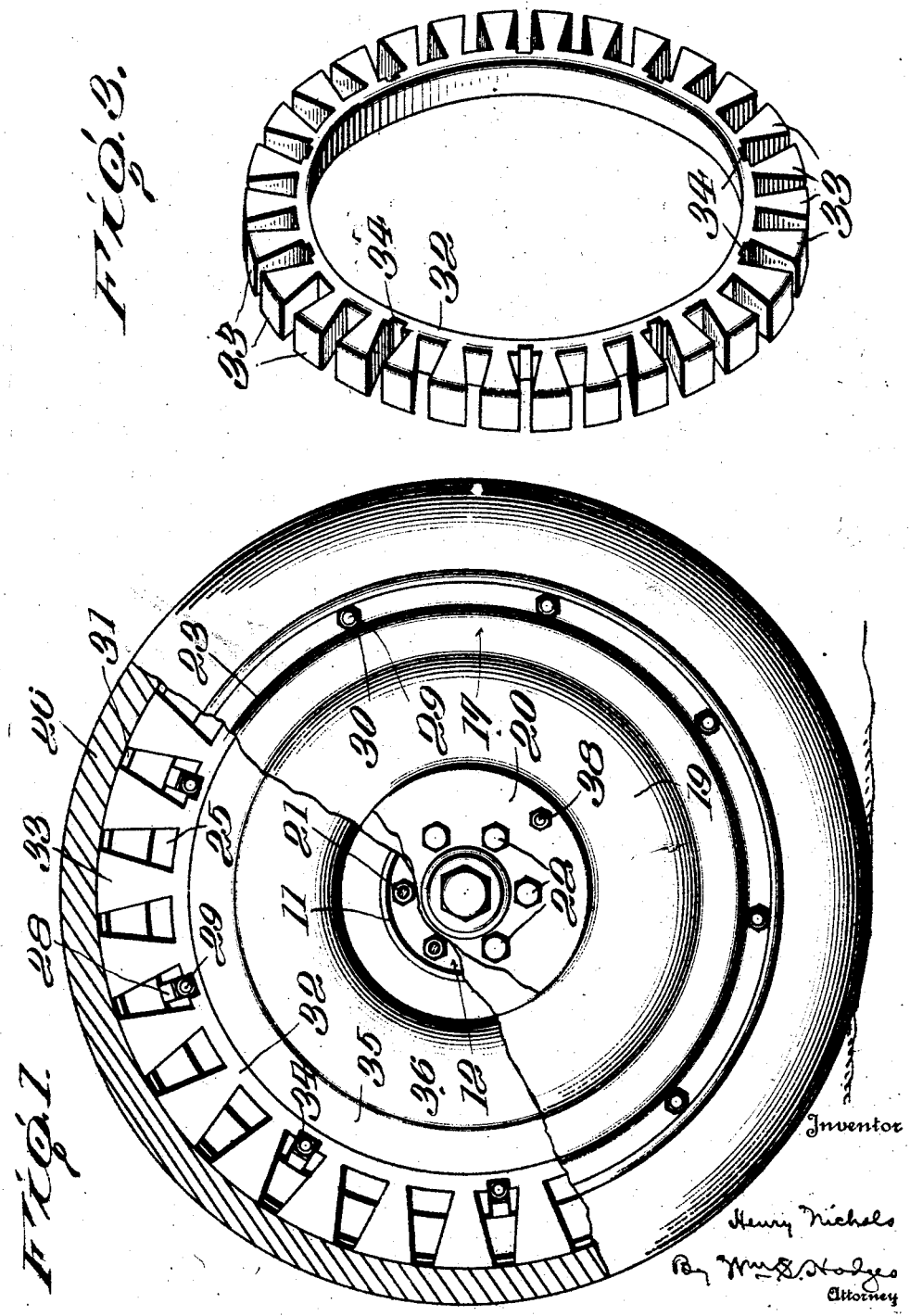

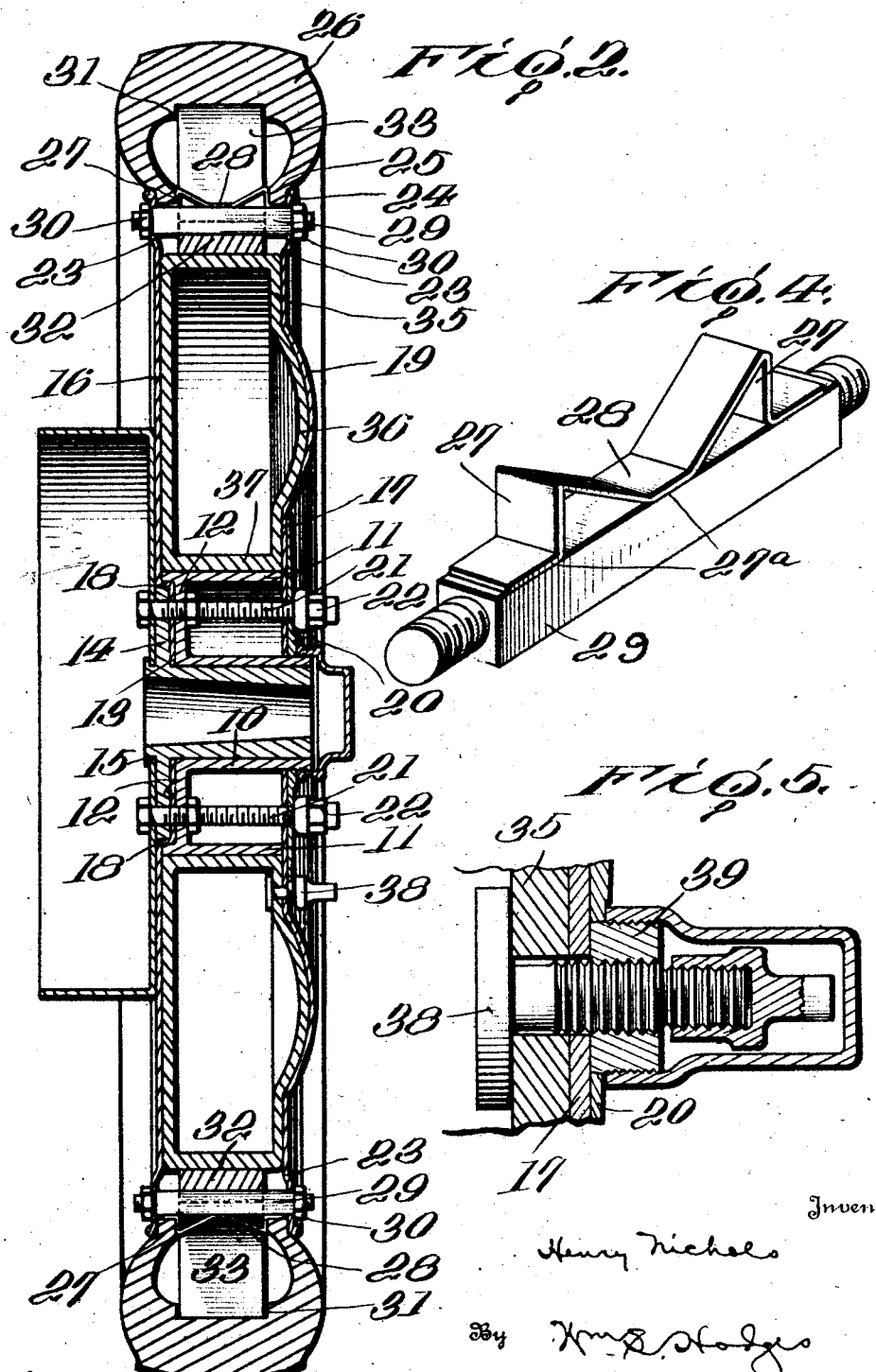

Patented Apr. 20, 1926.

1,581,860

UNITED STATES PATENT OFFICE.

HENRY NICHOLS, OF NEW YORK, N. Y.

VEHICLE WHEEL.

Application filed January 26, 1925. Serial No. 4,870.

*To all whom it may concern:*

Be it known that I, HENRY NICHOLS, a citizen of the United States, residing at New York, in the county of New York and State of New York, have invented a new and useful Vehicle Wheel, of which the following is a specification.

This invention is a wheel for motor vehicles and the like, having means substituted for the standard pneumatic tire to absorb road and other shocks imparted to the wheel while in operation.

One of the objects of the invention is to provide a wheel of simple construction, which will have all of the beneficial advantages of a wheel equipped with a pneumatic tire, and yet not be subjected to the inconveniences which usually result from punctures and blow-outs. A further object is to provide a wheel formed of separable sections, having means whereby a shoe similar to that of a standard pnuematic tire may be attached thereto, without employing the usual standard type attaching rim normally secured to the periphery of a motor vehicle wheel. A further object is to provide means for securing the tire shoe to the wheel body in such manner that the shoe is braced internally and externally, at the point of attachment to the wheel, in a manner to securely retain the parts in operative relation under the most severe strains which may result from a skid. A further object is to provide a pneumatic cushion of maximum capacity for the wheel, so positioned that it will not be exposed to wear, or contact with the road-bed, and means whereby it may be anchored against excessive movement or creeping with respect to the wheel body. A further object is to provide internal equalizing means for the tire shoe constructed of a material having more or less resilience, said equalizing means being in direct contact with the pneumatic cushion, so that all shocks on the tire tread are conveyed to said cushion and distributed around the wheel in the same manner as is ordinarily the case with the stardard pneumatic tire. A further object is to provide means for reenforcing the sides of the wheel to resist the outwardly directed forces exerted by the pneumatic cushion.

The invention will be hereinafter fully set forth and particularly pointed out in the claims.

In the accompanying drawing:—

Figure 1 is a side elevation with parts broken away, illustrating a wheel constructed in accordance with the invention. Figure 2 is a transverse sectional view. Figure 3 is a perspective view illustrating the equalizing member. Figure 4 is an enlarged view illustrating one of the tire-shoe retaining bolts. Figure 5 is an enlarged sectional view illustrating the method of bracing the air valve.

Referring to the drawing, the wheel is constructed with the hub member 10, encircled by a relatively spaced concentric shell, which is joined to the hub at one end by a wall 12. The said wall 12 is spaced inwardly from the inner end of the shell 11 to provide a recess 13, to receive the flange 14, of the hub bearing 15.

The body of the wheel is formed of side plates 16 and 17 abutting against the opposite ends of the sleeve 11, and provided with openings for the passage of the hub 10 and the hub bearing sleeve 15, respectively. The plate 16 is provided with a central offset portion 18, which is interposed between the flange 14 and the wall 12. The plate 17 is provided with an annularly positioned bulged portion 19, for a purpose to be later described. Extended through suitable openings in the flange 14, the offset portion 18, the wall 12, the plate 17, and a brace plate 20 engaging the outer face of the side plate 17, are bolts 21, threaded to receive nuts 22. By means of these bolts and nuts, the plates and hub members are securely and rigidly clamped together contiguous to the hub, although the invention is not limited to these details.

The peripheral portions of the plates 16 and 17 are offset outwardly as indicated at 23 to provide clamping flanges 24 for the edges 25 of a tire shoe 26. The tire shoe may be of any desired construction, but preferably of the same general style and structure as the usual type of shoe employed with a standard pneumatic tire.

The tire shoe is retained in position by having the edges 25 clamped between the flanges 24, and shoulders 27 of abutment members 28, by means of clamp bolts 29 having threaded portions to receive nuts 30. Each abutment member 28 may be constructed independently of its bolt or it may be attached to the bolt as illustrated at 27ª in Figure 4. The shoulders 27 engage the inner wall surfaces of the edges 25 of the tire shoe, so as to resist the pressure brought upon those portions of the tire shoe by the flanges 24, through the medium of the nuts 30 working on the threaded portions of the bolts 29. Said bolts are preferably square in cross section, so that they will not turn when in position.

The tire shoe 26 is provided with an internal channel 31 in alignment with the tread portion, said channel serving as a seat for the circular equalizing member formed of a flexible body portion 32, provided with radially extended cushion members 33. Said cushion members are of approximately triangular shape in side elevation, with the apex of the triangle engaging the body 32, the base of the triangle forming peripheral portions which extend into the channel 31, the members 33 being separated by spaces which are also of triangular form. The body 32 is provided with seats 34 for the bolts 29. In practice, the body portion 32 of the equalizing member encircles and directly contacts with the periphery of a pneumatic cushion 35, which fills the space between the equalizing member and the shell 11. Said pneumatic cushion is constructed with approximately flat side walls, one of which is provided with an annular bulged portion 36, complemental to the bulge 19 in the plate 17. The complemental bulged portions limit relative radial movement of the contacting parts and reduce the friction upon said parts. The shell extends through an opening formed by the inner wall 37 of the pneumatic cushion, so that when said cushion is inflated there is a direct reaction between the shoe 26, the equalizing member 32, the pneumatic cushion 35, and the shell 11. The pneumatic cushion is provided with a valve 38 similar to the valve of a standard pneumatic tire, said valve extending through suitable openings in the plates 17 and 20, and being held rigidly in place by means of a nut 39, so as to prevent creeping or shearing of the valve. By this arrangement all shearing strains are taken off of the valve. If desired the shoulders 27 of the bolts 29 may be omitted, in which event the equalizing member 32 will offer sufficient surface areas to act as abutments, for the purpose of assisting the side plates in securing the tire shoe in place. The cushion member extends inwardly a sufficient distance to extend beyond the peripheral edges of said side plates.

In operation, the pneumatic cushion 35 is inflated to the desired pressure, approximating that of the standard pneumatic tire. When the wheel is without load the air pressure in said cushion acting upon the equalizing member 32, will force the cushions 33 outwardly in a radial direction, and thereby maintain the tire shoe 26 in distended relation by reason of the pressure of said equalizing member against the wall of the channel 31. When the wheel is under load the equalizing member is forced inwardly and the pressure thus created is equalized at the pneumatic cushion by the yielding of the members 33, in much the same manner as the standard pneumatic tire distributes the load. The acute angled formations of the cushion blocks 33 serve to make the equalizing member sensitive to shocks, and to uniformly distribute the shocks around the wheel with the help of the pneumatic cushion 35.

From the foregoing it will be readily understood that a very simple and inexpensive wheel is provided, which is so constructed that the parts may be readily separated whenever necessary for repair or other purposes. To separate the sections, it is only necessary to remove the hub cap and the nuts 22 and 30 on one side of the wheel, thereby releasing the plate 17, which may then be removed. By means of this arrangement the interior of the wheel is made readily accessible. By placing the pneumatic cushion between the side plates, so that it will not be exposed to direct contact with extraneous substances, all of the advantages of the standard pneumatic tire are obtained and the usual inconveniences which result from punctures and blowouts are avoided. By shaping the side plates so as to provide the flanges 24 and providing the bolts 29 with the abutment members 28, a simple and efficient means is provided for firmly clamping the tire shoe in position by such a pressure as will resist practically all strains incident to skidding. If it is desired to remove the tire it is only necessary to remove the nuts 30, so as to relieve the clamping pressure upon the tire shoe and permit its ready withdrawal. It will be particularly noted that the tire shoe is connected to the rest of the wheel, without the employment of an intervening standard type tire attaching rim. By providing the plate 17 with the bulged portion 19, and forming the pneumatic cushion with a portion complemental thereto, said cushion is anchored to its position so that it will not creep radially with respect to the wheel, while the latter is in operation. No claim is made in this case for the subject-matter of the copending application, Ser. No. 729,720 filed August 2, 1924.

Having thus explained the nature of the invention and described an operative manner of constructing and using the same, although without attempting to set forth all of the forms in which it may be made, or all of the forms of its use, what is claimed is:—

1. A wheel of the character described comprising a hub member, side plates, means attaching the side plates to said hub member, a pneumatic cushion interposed between the side plates and encircling said hub member, said cushion being disconnected from said hub, a tire shoe, a flexible equalizing member interposed between the pneumatic cushion and the tire shoe and having direct contact with both, and means cooperating with the side plates for retaining said tire shoe in position.

2. A wheel of the character described comprising a hub member, side plates, means attaching the side plates to said hub member, a pneumatic cushion interposed between the side plates and encircling said hub member, a tire shoe retained in position by said side plates, an equalizing member located within said shoe and encircling said pneumatic cushion, said equalizing member having outwardly disposed cushion members engaging the tire shoe, said equalizing member being of a radial height to extend inwardly beyond the edges of the shoe and the peripheral edges of said side plates.

3. A wheel of the character described comprising a hub member, side plates, means attaching the side plates to said hub member, a pneumatic cushion interposed between the side plates and encircling said hub member, a tire shoe, means cooperating with the side plates for retaining the tire shoe in position, an equalizing member encircling said pneumatic cushion and provided with radially disposed solid cushion members engaging the tire shoe, said cushion members being of triangular form in side view with the bases of the triangles positioned contiguous to the tire shoe.

4. A wheel of the character described comprising a hub member, a pneumatic cushion encircling the hub member, a tire shoe, means interposed between the pneumatic cushion and the tire shoe for holding said shoe in distended condition, internal abutment means interposed between the edges of the tire shoe, and side plates secured to said hub member, and cooperating with said abutment means to retain the tire shoe in position, whereby the distending means is unhampered in its operation.

5. A wheel of the character described comprising a hub member, side plates secured thereto, a pneumatic cushion encircling the hub member, a tire shoe, means interposed between the pneumatic cushion and the tire shoe for holding said shoe in distended condition, bolts engaging said side plates, internal abutment members interposed between the edges of the tire shoe and engaging said bolts, said side plates cooperating with said abutment means to retain the tire shoe in position, whereby the tire shoe is unhampered in its operation, and clamping nuts engaging said bolts.

6. A wheel of the character described comprising a hub member, side plates, means attaching the plates to the said hub member, a pneumatic cushion interposed between the side plates and encircling said hub member, a tire shoe, an equalizing member encircling said pneumatic cushion and extending into said tire shoe, clamping bolts engaging said side plates, and having abutment shoulders engaging the surfaces of the inner walls of the shoe, said bolts having threaded portions extending through the side plates, and nuts engaging the threaded portions of said bolts.

7. A wheel of the character described comprising a hub member, side plates, means attaching the side plates to the hub member, a pneumatic cushion interposed between the side plates and encircling said hub member, a tire shoe, an equalizing member encircling said pneumatic cushion and provided with radially disposed solid cushion members engaging the tire shoe, internal abutment members located between said cushion members and engaging the tire shoe, and means cooperating with the side plates and abutment members to retain the tire shoe in position.

8. A wheel of the character described comprising a hub member, side plates, means attaching the side plates to said hub member, a pneumatic cushion interposed between the side plates and encircling said hub member, a tire shoe, an equalizing member encircling said pneumatic cushion and provided with radially disposed solid cushion members engaging the tire shoe, bolts extending through certain of the spaces between the cushion members and provided with shoulders positioned to engage the inner walls of the tire shoe, said bolts having threaded portions extending through said plates, and nuts working on said threaded portions.

9. A wheel of the character described comprising a hub member, side plates, means attaching the said plates to the hub member, a pneumatic cushion interposed between the side plates and encircling said hub member, a tire shoe, an equalizing member encircling said pneumatic cushion and provided with radially disposed solid cushion members engaging the tire shoe, bolts extending through said plates and provided with shoulders extending into the shoe, and clamping nuts engaging said bolts.

10. A wheel of the character described comprising a hub member, side plates, means attaching the side plates to the hub member, a pneumatic cushion interposed between the side plates, and encircling said hub member, a tire shoe, an equalizing member encircling said pneumatic cushion and provided with radially disposed solid cushion members engaging the tire shoe, said equalizing member having seats interposed between certain of the cushion members, bolts located in said seats and having threaded portions projecting through said plates, abutment members having integral shoulders positioned to engage the inner walls of the shoe, and nuts working on the threaded ends of said bolts.

11. A wheel of the character described comprising a hub member, side plates, means attaching side plates to the hub member, a pneumatic cushion interposed between the side plates and encircling said hub member, a tire shoe, an equalizing member interposed between the pneumatic cushion and the tire shoe and having direct contact with both, internal abutment members provided with shoulders positioned to engage the inner surfaces of the tire shoe and having ends which project laterally beyond the edges of the tire shoe, and means cooperating with said side plates and said abutment members to retain the shoe in place.

12. A wheel of the character described comprising a hub member, side plates, means attaching the side plates to said hub member, a pneumatic cushion interposed between the side plates and encircling said hub member, a tire shoe having an internal groove in its tread portion, a flexible equalizer member interposed between the pneumatic cushion and the tire shoe and having its peripheral portion located in said groove, and means cooperating with the side plates for retaining said tire shoe in position.

13. A wheel of the character described comprising a hub member, a pneumatic cushion encircling said hub member, said cushion having approximately flat side walls, one of which is provided with an annular bulged portion, a tire shoe, means between said cushion and said shoe for holding the latter in distended condition, and side plates secured to said hub, one of said side plates having a complemental annular bulged portion into which the bulged portion of the tire shoe fits, so as to limit relative movement of the cushion and side plates, whereby friction is reduced.

14. A wheel of the character described comprising a hub member, a pneumatic cushion encircling the hub member, a tire shoe, means interposed between the pneumatic cushion and the tire shoe for holding said shoe in distended condition, and side plates secured to said hub member and provided with peripheral clamping flanges engaging the outer faces only of the beads of said tire shoe, whereby the side plates retain the tire shoe in position, said tire shoe distending means being located within said tire shoe and extending inwardly beyond the peripheral edges of said side plates.

15. In a wheel of the character described an equalizing member comprising a circular body portion provided with outwardly extended radially positioned cushion members of approximately triangular shape in side view, with the apex of the triangle engaging the body portion.

In testimony whereof I have hereunto set my hand.

HENRY NICHOLS.